United States Patent
Tsujihata et al.

(10) Patent No.: US 11,990,963 B2
(45) Date of Patent: May 21, 2024

(54) RADIO COMMUNICATION APPARATUS AND RADIO TRANSMISSION METHOD

(71) Applicant: Fujitsu Limited, Kawasaki (JP)

(72) Inventors: Katsuhiko Tsujihata, Yokohama (JP); Kazuyuki Ozaki, Yokohama (JP); Shunsuke Fujio, Kawasaki (JP); Kunifumi Tamachi, Kawasaki (JP); Kazunori Sato, Yokohama (JP); Tadahiro Sato, Yokohama (JP); Hiroshi Okagawa, Kawasaki (JP); Yoji Ohashi, Fucyu (JP); Yusuke Furuumi, Kawasaki (JP); Shinichiro Kobayashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/958,976

(22) Filed: Oct. 3, 2022

(65) Prior Publication Data
US 2023/0208484 A1    Jun. 29, 2023

(30) Foreign Application Priority Data

Dec. 28, 2021    (JP) .................................. 2021-214562

(51) Int. Cl.
*H04B 7/06*    (2006.01)
*H04B 7/0456*    (2017.01)

(52) U.S. Cl.
CPC ......... *H04B 7/0617* (2013.01); *H04B 7/0456* (2013.01)

(58) Field of Classification Search
CPC .. H04B 7/0617; H04B 7/0456; H04B 7/0408; H04B 7/0695

USPC ......................................................... 375/267
See application file for complete search history.

(56) References Cited

U.S. PATENT DOCUMENTS

| | | | |
|---|---|---|---|
| 2015/0244478 A1 | 8/2015 | Shirakata et al. | |
| 2018/0026683 A1 | 1/2018 | Manholm et al. | |
| 2018/0310283 A1* | 10/2018 | Deenoo | H04W 72/23 |
| 2018/0316411 A1 | 11/2018 | Yoshimura et al. | |

(Continued)

FOREIGN PATENT DOCUMENTS

| | | |
|---|---|---|
| JP | 2015-162823 A | 9/2015 |
| JP | 2018-67852 A | 4/2018 |
| JP | 2018-512780 A | 5/2018 |

OTHER PUBLICATIONS

Extended European Search Report with the European search opinion issued by the European Patent Office for corresponding European Patent Application No. 22199433.8-1206, dated May 23, 2023.

*Primary Examiner* — Fitwi Y Hailegiorgis
(74) *Attorney, Agent, or Firm* — Myers Wolin, LLC

(57) ABSTRACT

A radio communication apparatus includes a plurality of antennas, a radio transmission unit configured to execute radio transmission processing on data to be transmitted from the plurality of antennas, and a processor connected to the radio transmission unit. The processor executes a process including acquiring beam group specification information that specifies a beam group that is capable of being formed when the data to be transmitted is transmitted, forming at least one beam included in the beam group, and correcting an envelope of a beam group using correction factors, the beam group including the at least one beam formed, the correction factors corresponding to the beam group specification information.

7 Claims, 8 Drawing Sheets

(56) References Cited

U.S. PATENT DOCUMENTS

2020/0059290 A1 2/2020 Pan et al.
2020/0099426 A1 3/2020 Simonsson et al.

* cited by examiner

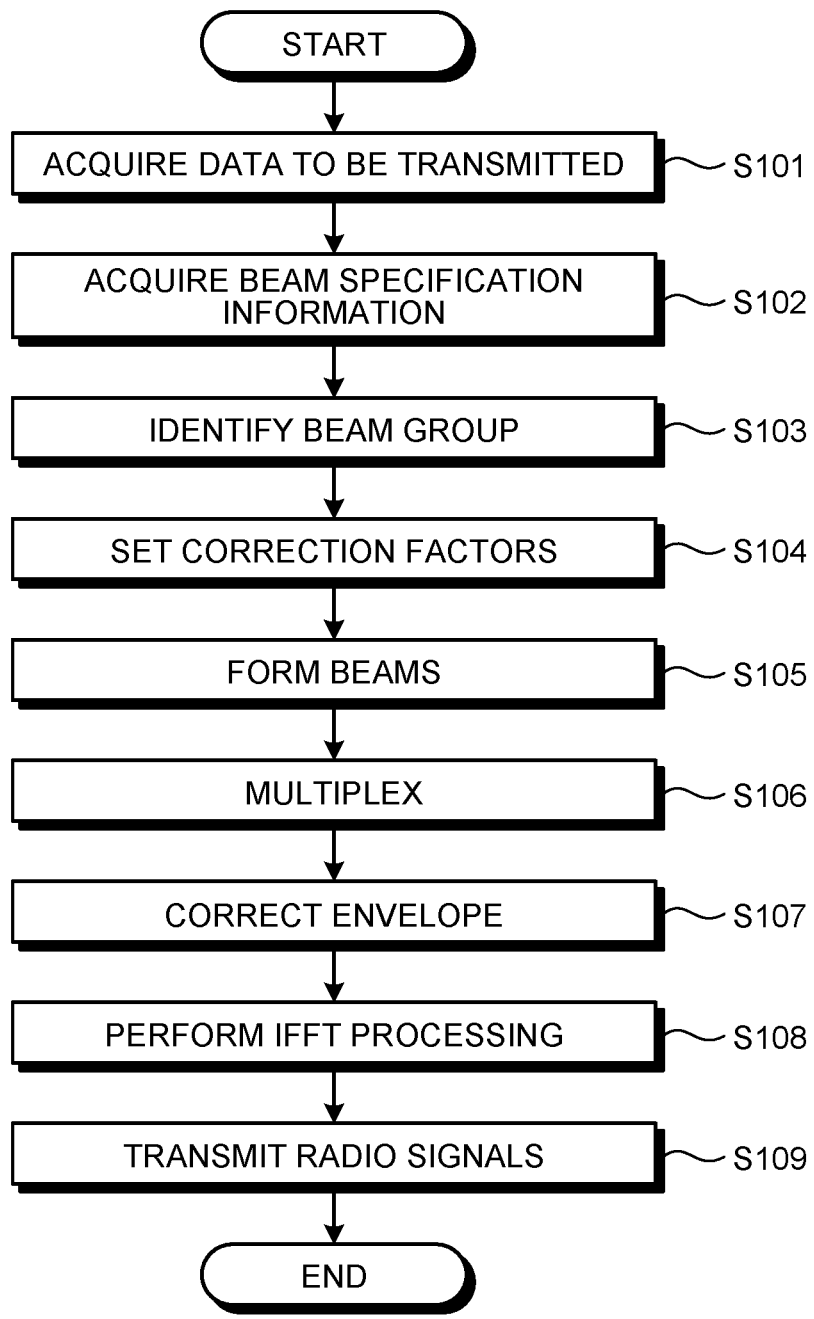

RADIO COMMUNICATION APPARATUS AND RADIO TRANSMISSION METHOD

CROSS-REFERENCE TO RELATED APPLICATION

This application is based upon and claims the benefit of priority of the prior Japanese Patent Application No. 2021-214562, filed on Dec. 28, 2021, the entire contents of which are incorporated herein by reference.

FIELD

The embodiments discussed herein are related to a radio communication apparatus and a radio transmission method.

BACKGROUND

Generally, radio communication systems where, for example, mobile phones are used employ such a technique as multiple input multiple output (MIMO) or beam forming that utilizes a large number of antennas to increase communication capacities and improve transmission qualities. That is, a base station apparatus and a terminal device that belong to a radio communication system transmit and receive signals by radio using a plurality of antennas.

With MIMO, for example, different signals are transmitted simultaneously from different antennas of a base station apparatus, and the respective signals from the antennas are separated at a receiving terminal device, whereby the communication capacity can be increased. With beam forming, for example, phase differences are assigned to signals to be transmitted from different antennas of a base station apparatus, whereby beams that increase a gain in a direction toward a receiving terminal device are formed. The transmission quality can be thus improved, and the communication capacity can be consequently increased.

Each radio communication system as described above is assigned a radio frequency band available to the radio communication system. For example, a radio communication system where mobile phones are used, as well as a satellite communication system, is assigned radio frequencies in the 3400 to 4100 MHz band. The related technologies are described, for example, in: Japanese Laid-open Patent Publication No. 2015-162823; Japanese Laid-open Patent Publication No. 2018-067852; and Japanese National Publication of International Patent Application No. 2018-512780.

SUMMARY

According to an aspect of the embodiments, a radio communication apparatus includes: a plurality of antennas; a radio transmission unit configured to execute radio transmission processing on data to be transmitted from the plurality of antennas; and a processor connected to the radio transmission unit, wherein the processor executes a process including: acquiring beam group specification information that specifies a beam group that is capable of being formed when the data to be transmitted is transmitted, forming at least one beam included in the beam group, and correcting an envelope of a beam group using correction factors, the beam group including the at least one beam formed, the correction factors corresponding to the beam group specification information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 5 is a flow diagram illustrating a radio transmission method;

DESCRIPTION OF EMBODIMENTS

Because a radio communication system and a satellite communication system are assigned the same radio frequency band, there has been an inconvenience where these communication systems interfere with each other. That is, signals transmitted and received in the radio communication system may interfere with communications in the satellite communication systems. In addition, signals transmitted and received in the satellite communication system may interfere with communications in the radio communication system.

Such interference impairs the communication capacities and the transmission qualities in both of these communication systems.

In one aspect, the embodiments provide a radio communication apparatus and a radio transmission method that are enabled to reduce interference with another communication system.

Preferred embodiments will be explained with reference to accompanying drawings. The present disclosure is not limited by this embodiment.

Figure 1:
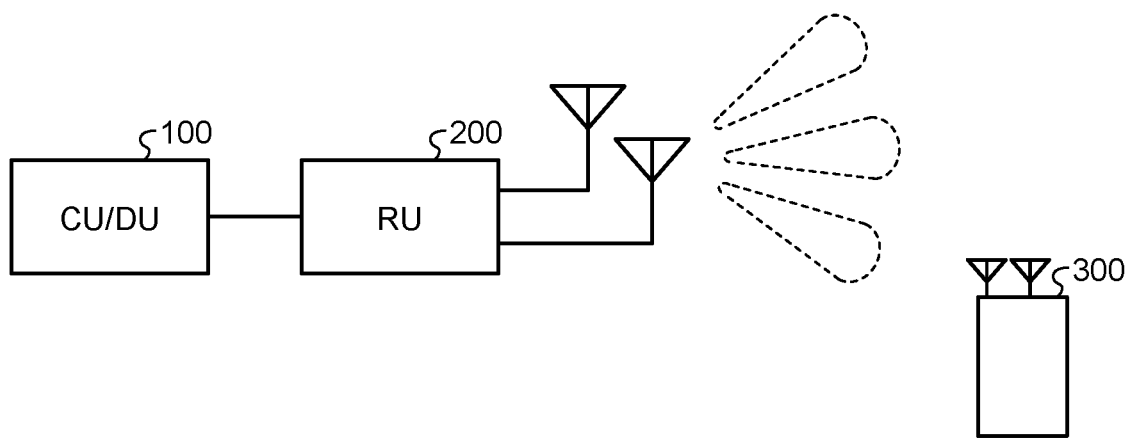
FIG. 1 is a diagram illustrating a configuration example of a communication system.

FIG. 1 is a diagram illustrating a configuration example of a communication system according to the embodiment. The communication system illustrated in FIG. 1 has a central unit/distributed unit (CU/DU) 100, a radio unit (RU) 200, and a UE 300 that is user equipment.

The CU/DU 100 is a baseband device included in a base station and performs baseband processing on data to be transmitted and received data. Specifically, the CU/DU 100 generates data to be transmitted to a plurality of the UEs 300 and transmits the data to the RU 200 through a fronthaul line. Additionally, the CU/DU 100 receives, from the RU 200 through the fronthaul line, data received from the UEs 300, and performs processing such as decoding on the received data.

In addition, the CU/DU 100 transmits an instruction to the RU 200 regarding beams to be formed by the RU 200. That is, the CU/DU 100 transmits, to the RU 200, beam specification information specifying a plurality of beams oriented in different directions and instructs the RU 200 to form the beams specified by the beam specification information.

The RU 200 is a radio communication apparatus included in a base station and performs radio processing on data to be transmitted and received data. Specifically, the RU 200 transmits by radio, from antennas, data to be transmitted to the UEs 300. In addition, the RU 200 receives by radio, through the antennas, data transmitted from the UEs 300 and performs certain radio reception processing on the received data.

The RU 200 includes a plurality of the antennas, thereby transmitting signals by radio after forming beams according to the instruction from the CU/DU 100. Herein, the RU 200 forms beams specified by the beam specification information. Based on the beam specification information, the RU 200 identifies a beam group to which the specified beams belong, and, using correction factors corresponding to the identified beam group, corrects the envelope of the beams to be formed. The configuration of the RU 200 is described in detail below.

The UE 300 is a terminal device that communicates with the RU 200 by radio. That is, the UE 300 receives signals transmitted from the RU 200 by radio through an antenna thereof and transmits signals to the RU 200 via the antenna.

Figure 2:
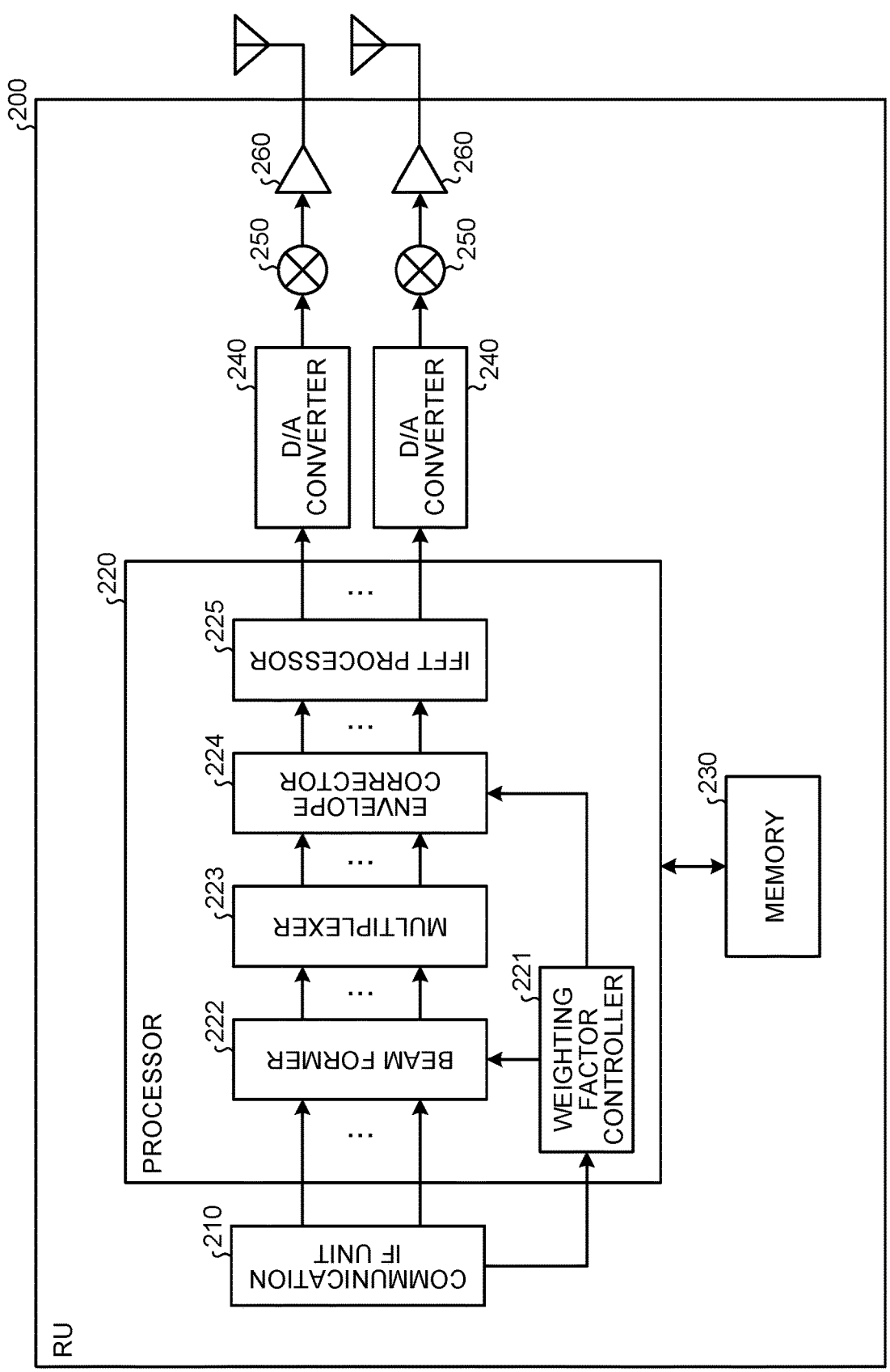
FIG. 2 is a block diagram illustrating a configuration of a radio communication apparatus according to an embodiment.

FIG. 2 is a block diagram illustrating a configuration of the RU 200 according to the embodiment. In FIG. 2, transmission-related processing units are illustrated and reception-related processing units are omitted. The RU 200 illustrated in FIG. 2 includes a communication interface unit (hereinafter simply referred to as "communication IF unit") 210, a processor 220, a memory 230, digital/analog (D/A) converters 240, up-converters 250, and power amplifiers 260.

The communication IF unit 210 connects to the CU/DU 100 through a fronthall line and communicates with the CU/DU 100. The communication IF unit 210 receives, from the CU/DU 100, data to be transmitted to a plurality of the UEs 300. The communication IF unit 210 receives the beam specification information from the CU/DU 100.

The processor 220 is a signal processor including, for example, a central processing unit (CPU), a field programmable gate array (FPGA), or a digital signal processor (DSP) and controls the entire RU 200. Specifically, the processor 220 has a weighting factor controller 221, a beam former 222, a multiplexer 223, an envelope corrector 224, and an inverse fast Fourier transform (IFFT) processor 225.

The weighting factor controller 221 acquires the beam specification information from the communication IF unit 210 and retains respective weighting factors for forming the beams specified by the beam specification information. When the communication IF unit 210 receives the beam specification information from the CU/DU 100, the weighting factor controller 221 outputs, to the beam former 222, the weighting factors for forming the beam according to the beam specification information. The weighting factor controller 221 identifies, from among a plurality of beam groups, a beam group to which the beams specified by the beam specification information belong, and notifies the envelope corrector 224 of the identified beam group, thereby causing the envelope corrector 224 to set correction factors for correcting the envelope of the beam group.

The beam former 222 acquires, from the communication IF unit 210, data to be transmitted to the UEs 300. Using the weighting factors output from the weighting factor controller 221, the beam former 222 forms beams to be used for transmitting the data. Specifically, the beam former 222 forms beams for pieces of data to be transmitted to the respective UEs 300 by: distributing the pieces of data to be transmitted to the respective UEs 300 to the logical antenna ports; and multiplying, by the weighting factors, the corresponding pieces of data to be transmitted that correspond to the respective logical antenna ports.

The multiplexer 223 multiplexes data to be transmitted to the UEs 300. The multiplexer 223 then outputs, to the envelope corrector 224, respective pieces of stream data corresponding to the different logical antenna ports and each containing the multiplexed data to be transmitted to the UEs 300.

When notified of information on a beam group by the weighting factor controller 221, the envelope corrector 224 sets correction factors corresponding to the beam group and corrects the envelope of the beam group by correcting the pieces of stream data using the correction factors. Specifically, the envelope corrector 224 performs a matrix operation to generate antenna streams the number of which equals the number of physical antenna ports. In the matrix operation, the pieces of stream data that correspond to the different logical antenna ports are multiplied by a matrix of the correction factors. Herein, the matrix of the correction factors, by which the pieces of stream data are multiplied, operates to decrease or increase the width of the envelope of the beam group that the weighting factor controller 221 has been notified of, and thus collectively corrects all of the beams in the beam group.

Figure 3:
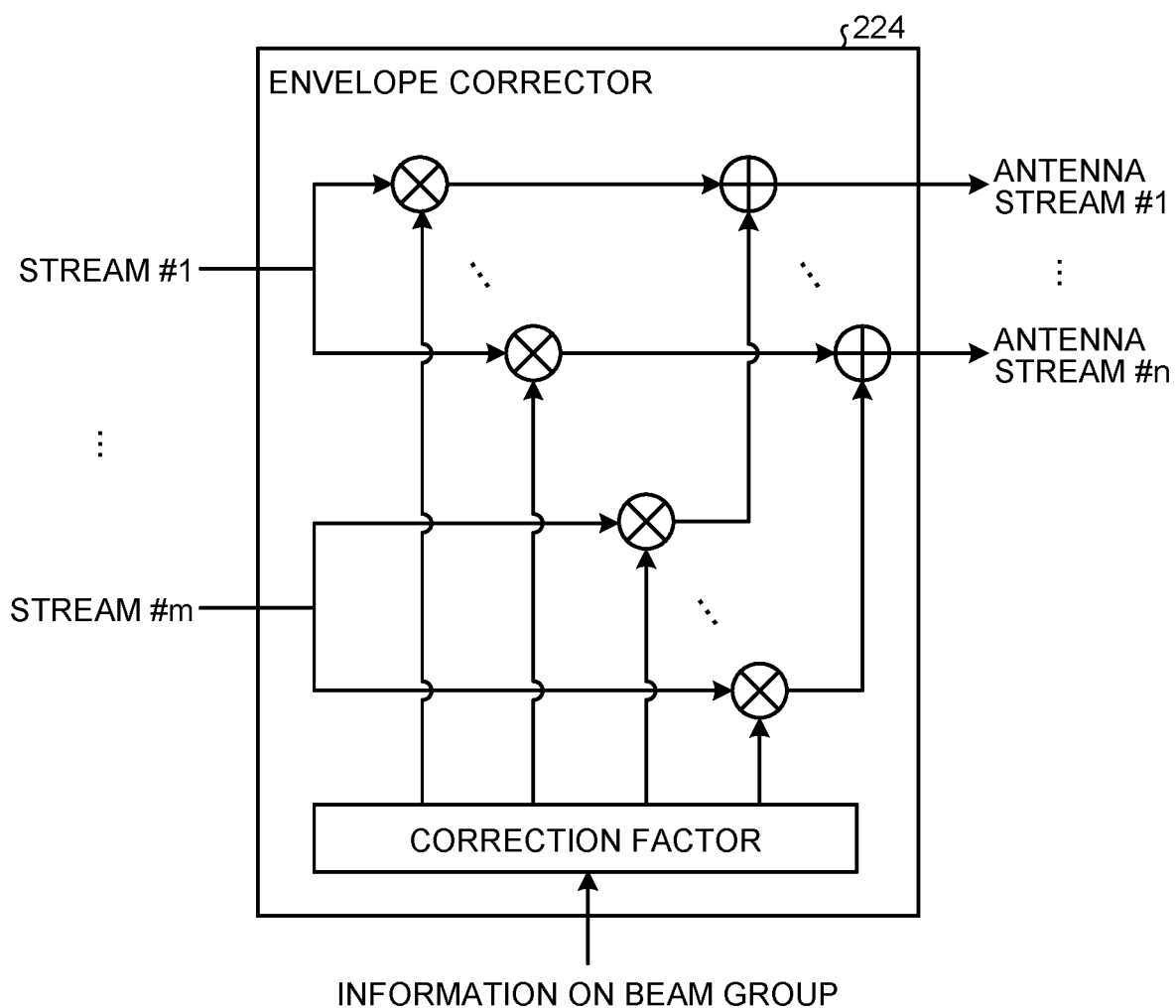
FIG. 3 is a diagram illustrating a configuration example of an envelope corrector.

FIG. 3 is a diagram illustrating a configuration example of the envelope corrector 224. As illustrated in FIG. 3, the envelope corrector 224 outputs antenna streams #1 #n corresponding to n physical antenna ports when streams #1 to #m corresponding to m logical antenna ports are input thereto, for example. The envelope corrector 224 includes a multiplier and an adder. The multiplier multiplies the streams #1 to #m by the correction factors corresponding to the beam group. The adder adds up multiplication results of the multiplier that correspond to the streams #1 to #m. The envelope corrector 224 then distributes each of the m streams #1 to #m to n signals, multiplies, by the correction factors, the distributed signals thus obtained, and adds up n results of the multiplication that correspond to the streams, thereby generating n antenna streams #1 to #n. That is, the envelope corrector 224 generates the antenna streams #1 to #n by performing a matrix operation in which streams #1 to #m are multiplied by an n-by-m matrix of the correction factors.

Figure 4A:
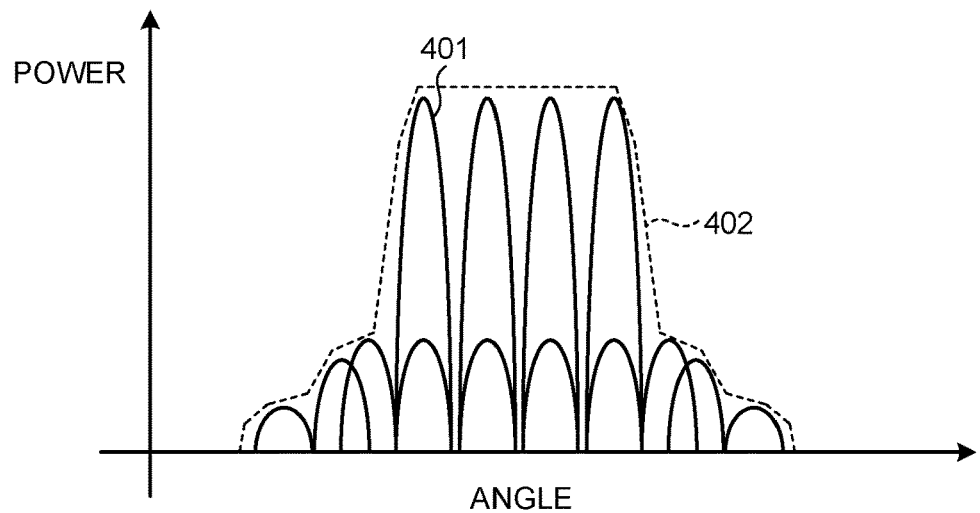
FIGS. 4A to 4C are diagrams illustrating a specific example of envelope correction.
Figure 4B:
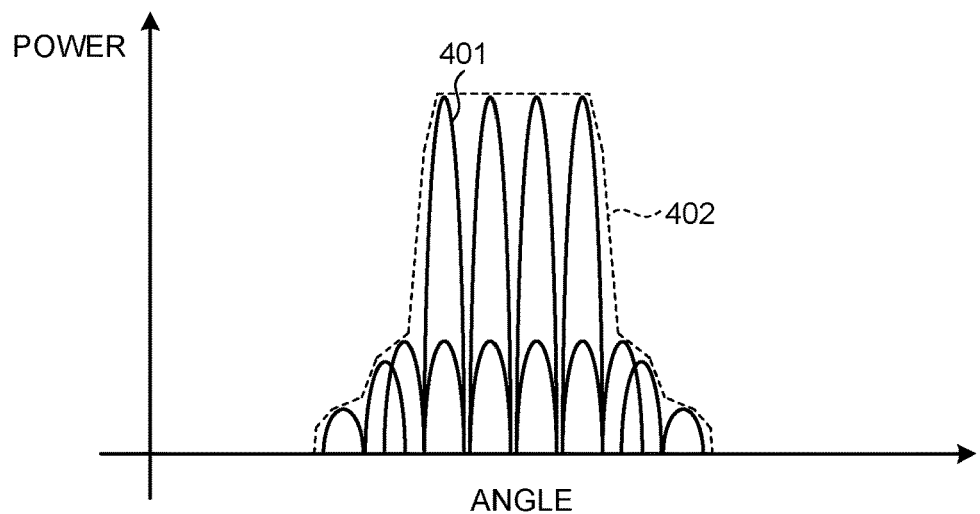
Figure 4C:
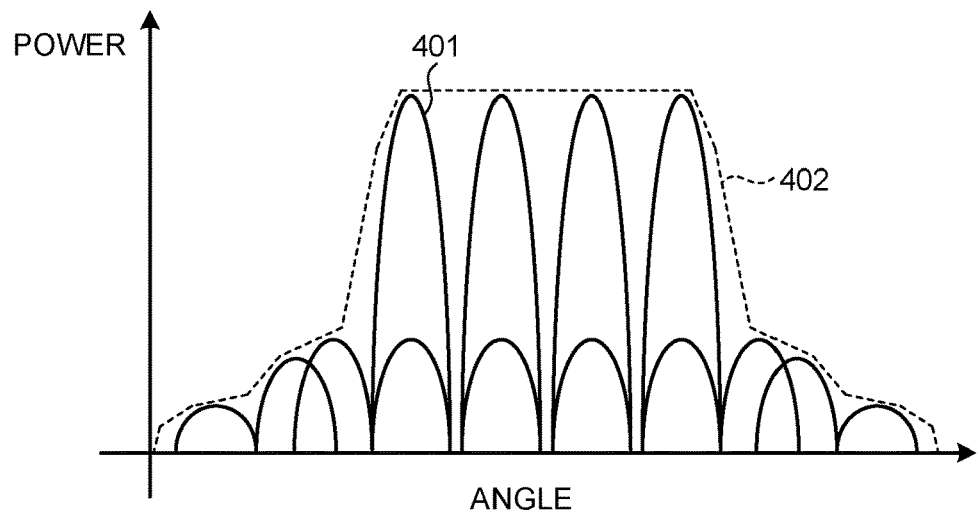

The matrix of the correction factors correspond to a beam group and operates to change the width of the envelope of this beam group. That is, for example, when a plurality of beams 401 in a beam group form an envelope 402 as illustrated in FIG. 4A, the correction factors are those that reduce the width of the envelope 402 as illustrated in FIG. 4B, or increases the width of the envelope 402 as illustrated in FIG. 4C. Such correction factors are previously determined for each beam group so that forming beams oriented in directions in which the beams are expected to interfere can be avoided. That is, for each beam group, correction factors are previously obtained; the correction factors correct the envelope of the beam group so that forming beams oriented in directions in which the beams are expected to interfere with, for example, communication in a satellite communication system can be avoided.

The stream data is corrected by, for example, correction factors for reducing the width of the envelope of the beam group, whereby forming beams oriented in directions in which the beams are expected to interfere with communication in other systems, such as a satellite communication system, can be avoided. Otherwise, the stream data is corrected by, for example, correction factors for increasing the width of the envelope of the beam group, whereby beams can be formed by utilizing, to a maximum degree, directions in which the beams do not interfere with communication in other systems. This improves the transmission quality and the communication capacity.

Returning to FIG. 2, the IFFT processor 225 performs IFFT processing on the antenna streams, the number of which equals the number of physical antenna ports, thereby transforming the antenna streams in the frequency domain into antenna streams in the time domain. The IFFT processor 225 outputs the antenna streams transformed into time-domain signals to the D/A converters 240 that correspond to the different physical antenna ports.

The memory 230 includes, for example, a random access memory (RAM) or a read only memory (ROM) and stores information used for processing to be executed by the processor 220.

The D/A converter 240, provided for each physical antenna port, performs D/A conversion on a corresponding antenna stream.

The up-converter 250, provided for each physical antenna port, up-converts a corresponding antenna stream, thereby converting the corresponding antenna stream to a radio frequency signal.

The power amplifier 260, provided for each physical antenna port, amplifies a corresponding antenna stream and transmits the corresponding antenna stream by radio from the antenna connected to that physical antenna port.

Next, the method for radio transmission that is performed by the RU 200 configured as described above is described with reference to the flow diagram illustrated in FIG. 5.

The CU/DU 100 transmits, to the RU 200, data to be transmitted by radio from the RU 200 to the UEs 300. The CU/DU 100 also transmits, to the RU 200, beam specification information specifying beams to be used for transmitting this data to be transmitted. When respective pieces of data to be transmitted to the UEs 300 are received by the communication IF unit 210 of the RU 200, the beam former 222 acquires this data to be transmitted (step S101). When the beam specification information to be used in transmission of these pieces of data to be transmitted is received by the communication IF unit 210, the weighting factor controller 221 acquires the beam specification information (step S102).

The weighting factor controller 221 then identifies, from among a plurality of predefined beam groups, a beam group to which the beams specified by the beam specification information belong (step S103). That is, this single beam group is identified because all of the beams specified by the beam specification information belong to the same beam group. The envelope corrector 224 is notified of the identified beam group, and correction factors that correspond to the beam group and correct the envelope of the beam group are set in the envelope corrector 224 (step S104).

Meanwhile, the weighting factor controller 221 outputs, to the beam former 222, weighting factors to form the beams specified by the beam specification information. Using the weighting factors, the beam former 222 forms the beams to be used in transmission of the respective pieces of data to be transmitted to the UEs 300 (step S105). That is, the respective pieces of data to be transmitted to the respective UEs 300 are distributed to the logical antenna ports, and each of these pieces of data to be transmitted that correspond to the different logical antenna ports is multiplied by the weight factors.

Each of the respective pieces of data to be transmitted to the UEs 300 that correspond to the logical antenna port is multiplexed by the multiplexer 223 (step S106), and respective pieces of stream data that correspond to the different logical antenna ports are output to the envelope corrector 224. The envelope corrector 224 then performs a matrix operation between the respective pieces of stream data for the logical antenna ports and a matrix of the correction factors, thereby correcting the beams in such a manner as to change the width of the envelope of the beam group (step S107). That is, the pieces of stream data is distributed to the physical antenna ports, these pieces of stream data thus obtained that correspond to the different physical antenna ports are multiplied by the correction factors, and the results of the multiplication are added up for each physical antenna port, whereby an antenna stream for each physical antenna port is generated.

The IFFT processor 225 performs IFFT processing whereby the antenna stream is transformed from a frequency-domain signal to a time-domain signal (step S108). Each antenna stream then undergoes D/A conversion in the corresponding D/A converter 240 provided for each physical antenna port, up-conversion in the corresponding up-converter 250, and amplification in the power amplifier 260. The amplified antenna stream is transmitted by radio from an antenna connected to the corresponding physical antenna port (step S109). At this step, the data to be transmitted has been multiplied by the weighting factors by the beam former 222. While beams are thus formed, interference with other communication systems, such as a satellite communication system can be avoided because the beams have been corrected by the envelope corrector 224 in such a manner that the width of the envelope is controlled.

As described above, according to the present embodiment, beams specified by the beam specification information are formed, and then corrected in such a manner that the width of the envelope of the beam group is changed, using a correction factor corresponding to a beam group to which these beams belong. This can reduce interference with other communication systems by preventing beams from being formed in directions in which the beams are expected to interfere with communication of other communication systems.

Figure 6:
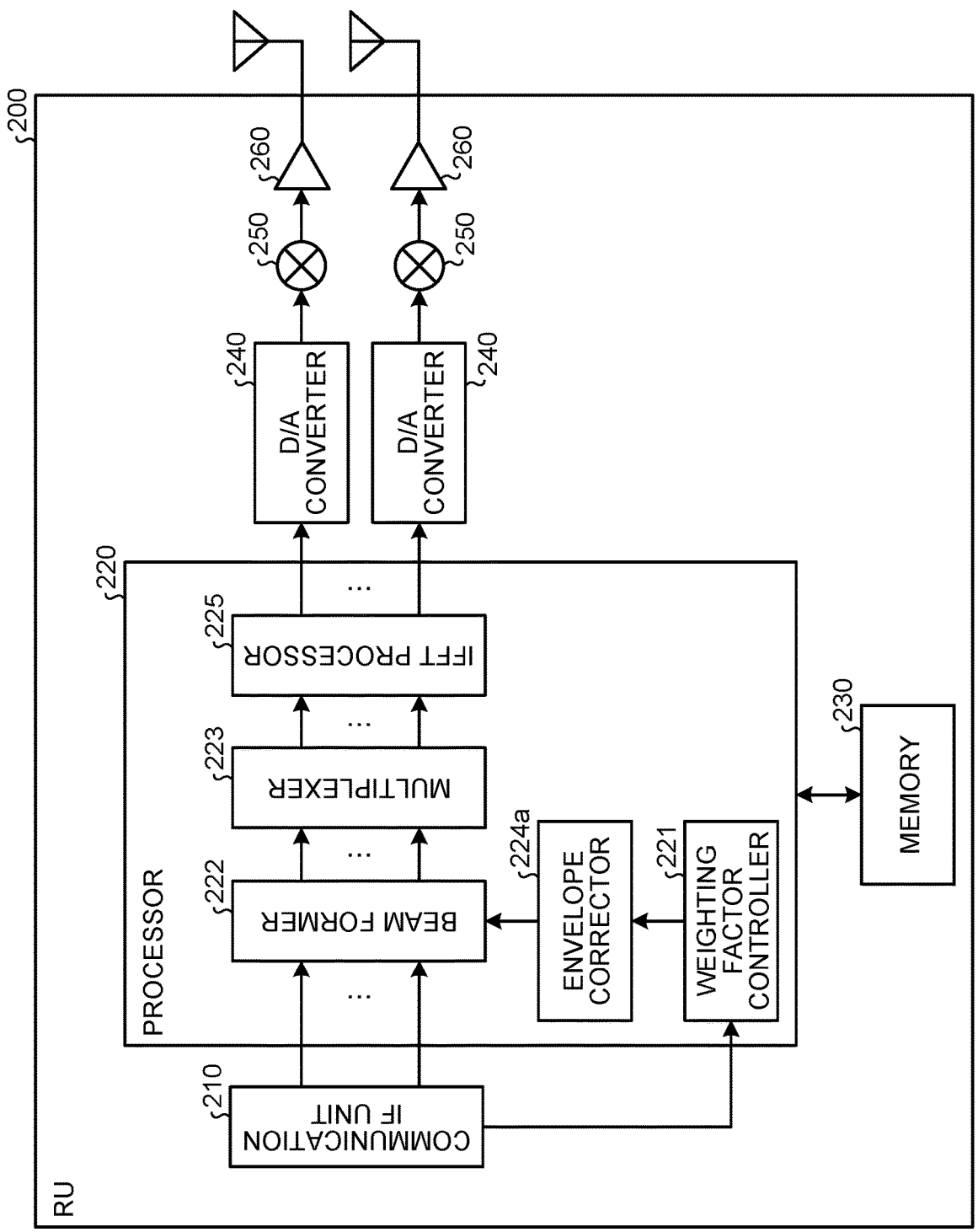
FIG. 6 is a block diagram illustrating a modification of the radio communication apparatus.

In the above embodiment, the envelope of the beam group is corrected by a matrix operation between respective pieces of stream data for logical antenna ports and a matrix of correction factors. However, the envelope of the beam group can alternatively be corrected by a matrix operation between respective weighting factors for logical antenna ports and a matrix of correction factors. FIG. 6 is a block diagram illustrating a modification of the RU 200 that corrects weighting factors. In FIG. 6, the same components as those in FIG. 2 have the same reference signs. The RU 200 illustrated in FIG. 6 includes an envelope corrector 224a in place of the envelope corrector 224 of the RU 200 illustrated in FIG. 2.

When notified of information on a beam group by the weighting factor controller 221, the envelope corrector 224a sets correction factors corresponding to the beam group and corrects the envelope of the beam group by correcting weighting factors using the correction factors. Specifically, the envelope corrector 224a performs a matrix operation to generate corrected weighting factors the number of which equals the number of physical antenna ports. In the matrix operation, the correction factors that correspond to the different logical antenna ports are multiplied by a matrix of the correction factors. Herein, the matrix of the correction factors, by which the weighting factors are multiplied, operates to decrease or increase the width of the envelope of the beam group that the weighting factor controller 221 has been notified of, and thus collectively correct all of the beams in the beam group.

Figure 7:
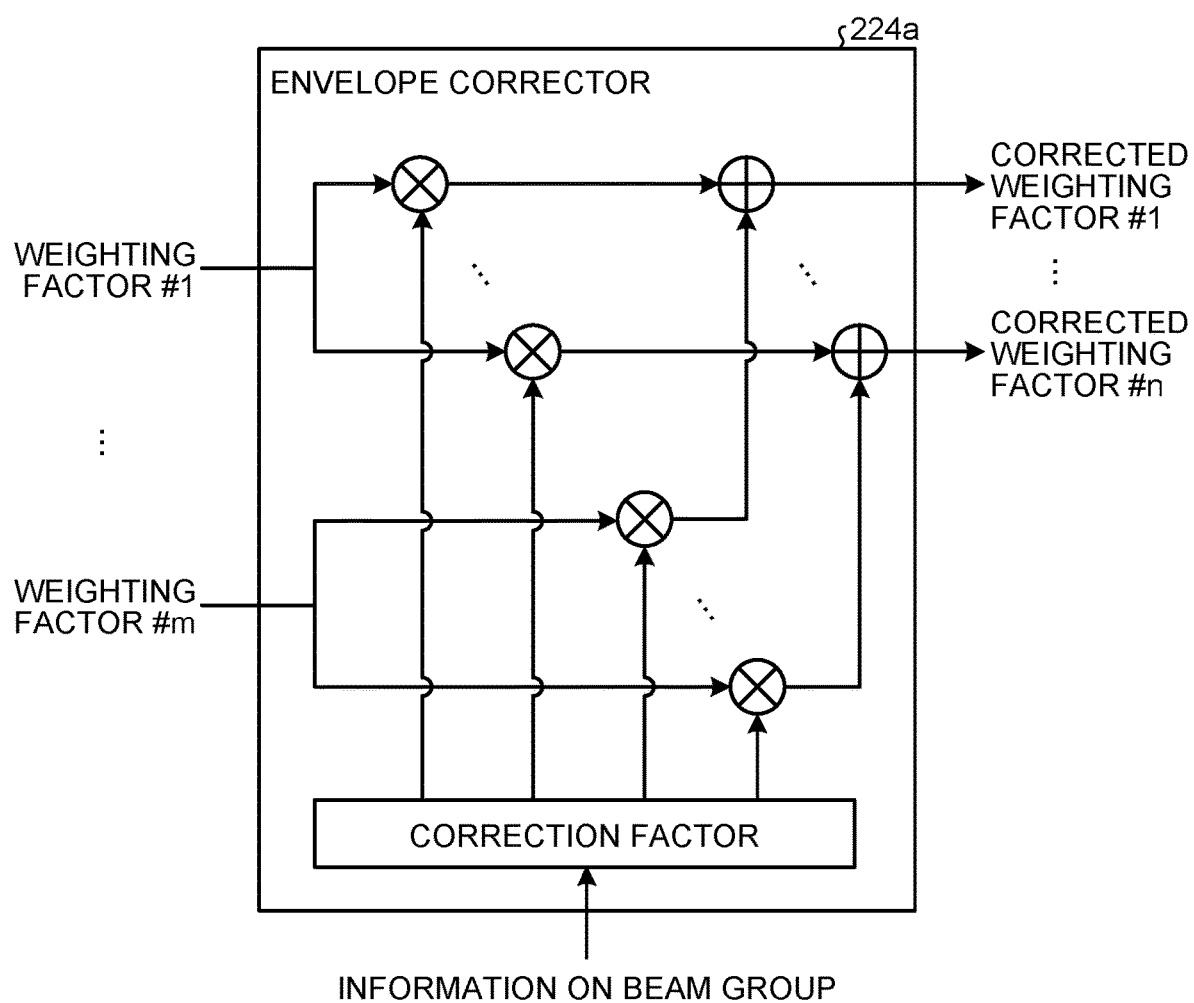
FIG. 7 is a diagram illustrating a configuration example of an envelope corrector.

FIG. 7 is a diagram illustrating a configuration example of the envelope corrector 224a. As illustrated in FIG. 7, the envelope corrector 224a outputs corrected weighting factors #1 to #n corresponding to n physical antenna ports when weighting factors #1 to #m corresponding to m logical antenna ports are input thereto, for example. The envelope corrector 224a includes a multiplier and an adder. The multiplier multiplies the weighting factors #1 to #m by the correction factors corresponding to the beam group. The adder adds up multiplication results of the multiplier that correspond to the weighting factors #1 to #m. The envelope corrector 224a then distributes each of the m weighting factors #1 to #m to n signals, multiplies, by the correction factors, the distributed signals thus obtained, and adds up n results of the multiplication that correspond to the weighting factors, thereby generating the n corrected weighting factors #1 to #n. That is, the envelope corrector 224a generates the corrected weighting factors #1 to #n by performing a matrix operation in which the weighting factors #1 to #m are multiplied by an n-by-m matrix of the correction factors.

The beam former 222 multiples, by the corrected weighting factors #1 to #n, the data to be transmitted to the UEs 300, thereby forming beams to be used for the data to be transmitted to the UEs 300. The beams thus formed are those that belong to a beam group the envelope of which has been corrected, and that are enabled to reduce interference with other communication systems.

Figure 8:
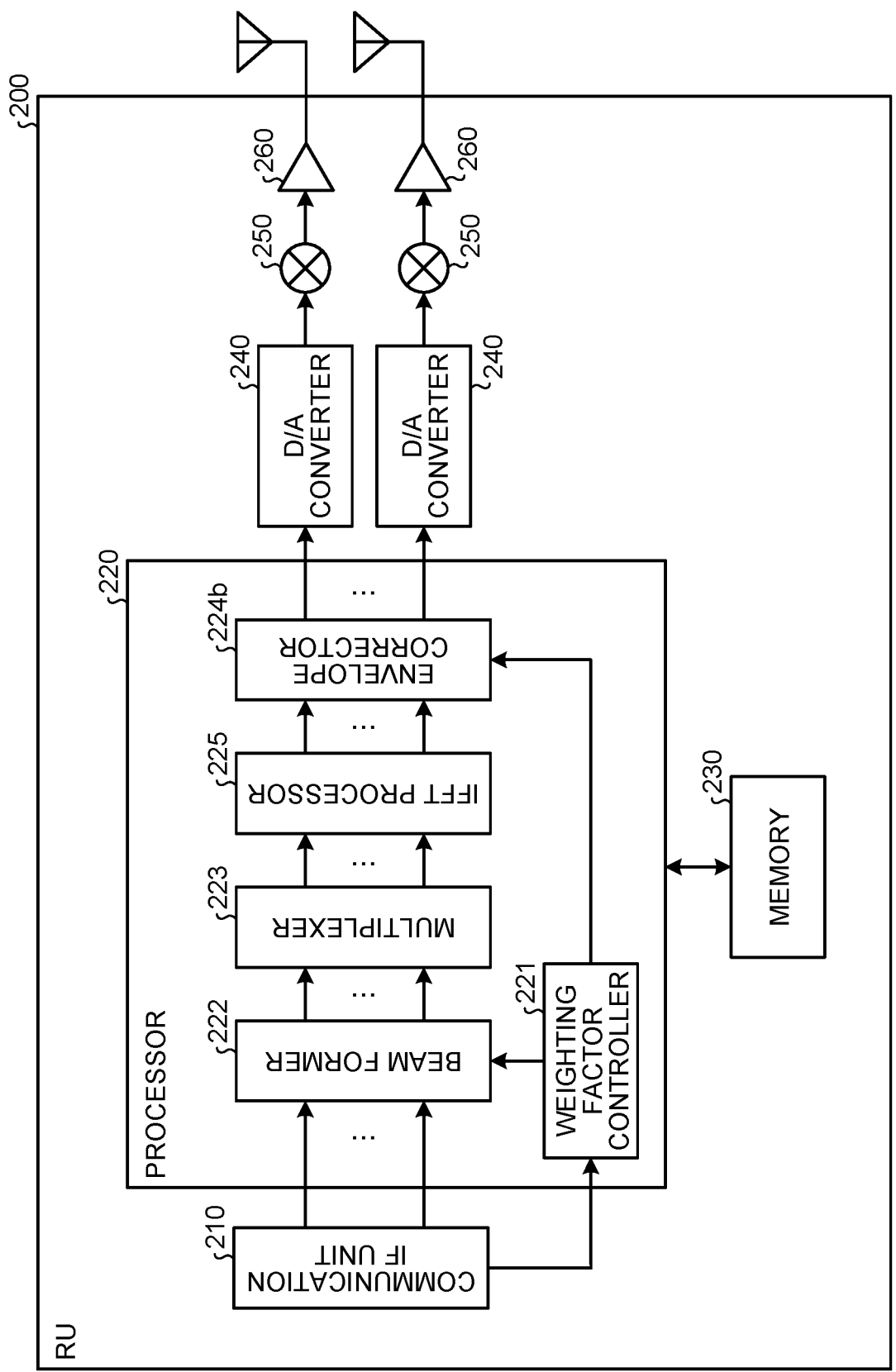
FIG. 8 is a block diagram illustrating another modification of the radio communication apparatus.

In the embodiment, the envelope of the beam group is corrected for frequency-domain signals. However, the envelope of the beam group can alternatively be corrected for time-domain signals. FIG. 8 is a block diagram illustrating a modification of the RU 200 that corrects time-domain signals. In FIG. 8, the same components as those in FIG. 2 have the same reference signs. The RU 200 illustrated in FIG. 8 includes an envelope corrector 224b in place of the envelope corrector 224 of the RU 200 illustrated in FIG. 2. The envelope corrector 224b is placed subsequent to the IFFT processor 225.

When notified of information on a beam group by the weighting factor controller 221, the envelope corrector 224b sets correction factors corresponding to the beam group and correct the envelope of the beam group by correcting stream data that is time-domain signals obtained by conversion performed by the IFFT processor 225. Specifically, the envelope corrector 224b performs a matrix operation to generate antenna streams the number of which equals the number of physical antenna ports. In the matrix operation, the pieces of stream data that correspond to the different logical antenna ports are multiplied by a matrix of correction factors. Herein, the matrix of the correction factors, by which the pieces of stream data are multiplied, operates to decrease or increase the width of the envelope of the beam group that the weighting factor controller 221 has been notified of, and thus collectively corrects all of the beams in the beam group.

Thus, correction of the envelope of a beam group and reduction of interference with other communication system are also possible by correcting stream data transformed into time-domain signals by the IFFT processor 225.

In one aspect, the radio communication apparatus and the radio transmission method disclosed in the present application produce the effect of reducing interference with another communication system.

All examples and conditional language recited herein are intended for pedagogical purposes of aiding the reader in understanding the disclosure and the concepts contributed by the inventors to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A radio communication apparatus comprising:
a plurality of antennas;
a radio transmitter configured to execute radio transmission processing on data to be transmitted from the plurality of antennas; and
processor circuitry connected to the radio transmitter, and configured to:
acquire beam group specification information that specifies a beam group that is capable of being formed when the data to be transmitted is transmitted,
form beams included in the beam group, and
correct an envelope of the beam group using correction factors, the beam group including the beams formed, the correction factors corresponding to the beam group specification information.

2. The radio communication apparatus according to claim 1, wherein the correcting includes executing a matrix operation in which a plurality of pieces of data to be transmitted that correspond to the plurality of antennas are multiplied by a matrix of the correction factors.

3. The radio communication apparatus according to claim 1, wherein the correcting includes correcting the envelope of the beam group by multiplying pieces of data to be transmitted in a frequency domain by the correction factors.

4. The radio communication apparatus according to claim 1, wherein
the processor circuitry is further configured to:
transform frequency-domain data to be transmitted into time-domain data to be transmitted, and
the correcting includes correcting the envelope of the beam group by multiplying the time-domain data to be transmitted by a correction factor.

5. A radio communication apparatus comprising:
a plurality of antennas;
a radio transmitter configured to execute radio transmission processing on data to be transmitted from the plurality of antennas; and
processor circuitry connected to the radio transmitter, and configured to:
acquire beam group specification information that specifies a beam group that is capable of being formed when the data to be transmitted is transmitted,
correct weighting factors for forming beams included in the beam group, using correction factors that correspond to the beam group specification information and change an envelope of the beam group, and
form beams for transmitting the data to be transmitted, using the corrected weighting factor.

6. The radio communication apparatus according to claim 5, wherein the correcting includes executing a matrix operation in which a plurality of pieces of weighting factors that correspond to the plurality of antennas are multiplied by a matrix of the correction factors.

7. A radio transmission method to be executed by a radio communication apparatus including a plurality of antennas, the radio transmission method comprising:
- acquiring beam group specification information that specifies a beam group that is capable of being formed when data to be transmitted is transmitted from the plurality of antennas;
- forming beams included in the beam group, and
- correcting an envelope of the beam group using correction factors, the beam group including the beams formed, the correction factors corresponding to the beam group specification information.

* * * * *